(12) United States Patent
Chakraborty et al.

(10) Patent No.: US 9,173,178 B2
(45) Date of Patent: Oct. 27, 2015

(54) METHOD AND SYSTEM FOR POWER HEADROOM REPORTING IN THE PRESENCE OF MULTIPLE TRANSMIT ANTENNAS

(75) Inventors: Soumen Chakraborty, Bangalore (IN);
Rishi Ranjan, Foster City, CA (US);
Erik Stauffer, Mountain View, CA (US);
Kamlesh Rath, San Ramon, CA (US);
Manish Airy, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 118 days.

(21) Appl. No.: 13/077,839

(22) Filed: Mar. 31, 2011

(65) Prior Publication Data

US 2012/0213149 A1 Aug. 23, 2012

Related U.S. Application Data

(60) Provisional application No. 61/384,765, filed on Sep. 21, 2010.

(51) Int. Cl.
*H04W 52/36* (2009.01)
*H04W 52/14* (2009.01)
*H04W 52/42* (2009.01)

(52) U.S. Cl.
CPC .......... *H04W 52/365* (2013.01); *H04W 52/146* (2013.01); *H04W 52/42* (2013.01)

(58) Field of Classification Search
CPC .................................................. H04W 52/365
USPC ........... 370/328–338, 311; 455/436–455, 522
See application file for complete search history.

(56) References Cited

U.S. PATENT DOCUMENTS 7,046,978 B2  5/2006  Burke et al.
7,206,607 B2  4/2007  Kim et al.
(Continued)

FOREIGN PATENT DOCUMENTS

CN  1643813 A  7/2005
CN  1723634 A  1/2006
(Continued)

OTHER PUBLICATIONS

Samsung, "UL Transmission Power Control in LTE-A," $3^{rd}$ Generation Partnership Project (3GPP), R1-091250, Seoul, Korea (Mar. 18, 2009).

(Continued)

*Primary Examiner* — Benjamin Lamont
(74) *Attorney, Agent, or Firm* — Sterne, Kessler, Goldstein & Fox P.L.L.C.

(57) ABSTRACT

A method and system are provided in which a mobile device may be operable for long term evolution (LTE) communication or some other wireless technology via two or more transmit antennas. The device may comprise a power amplifier for each transmit antenna with substantially similar maximum power being provided by both amplifiers. A power headroom value may be determined in the device based on path loss values between the transmit antennas and a base station and the maximum transmit power for each transmit antenna. Transmission via one of the transmit antennas may occur concurrently with transmission via another of the transmit antennas. The device may generate an indication of the determined power headroom value for communication to the base station. The power headroom value may be reported periodically or in response to a change in the power received at the base station.

28 Claims, 5 Drawing Sheets

(56) References Cited

U.S. PATENT DOCUMENTS

| | | | |
|---|---|---|---|
| 8,274,952 B2* | 9/2012 | Jard et al. | 370/335 |
| 2010/0158147 A1* | 6/2010 | Zhang et al. | 375/260 |
| 2010/0173665 A1* | 7/2010 | Michel et al. | 455/522 |
| 2010/0272091 A1* | 10/2010 | Fabien et al. | 370/345 |
| 2010/0279621 A1* | 11/2010 | Brown et al. | 455/67.11 |
| 2010/0296470 A1* | 11/2010 | Heo et al. | 370/329 |
| 2010/0315045 A1* | 12/2010 | Zeine | 320/137 |
| 2011/0038271 A1* | 2/2011 | Shin et al. | 370/252 |
| 2011/0243007 A1* | 10/2011 | Xiao | 370/252 |
| 2011/0280169 A1 | 11/2011 | Seo et al. | |
| 2012/0064936 A1* | 3/2012 | Vrzic et al. | 455/522 |

FOREIGN PATENT DOCUMENTS

| | | |
|---|---|---|
| EP | 2 293 618 A1 | 3/2011 |
| KR | 10-2010-0088084 A | 8/2010 |
| WO | WO 2010/065759 A2 | 6/2010 |
| WO | WO 2010/083324 A2 | 7/2010 |

OTHER PUBLICATIONS

European Search Report for EP Application No. EP 11 00 7534, Munich, Germany, search completed on Nov. 29, 2011.
Office Action for related Chinese Patent Application No. 2011102794488, mailed Nov. 12, 2013; 6 pages.

* cited by examiner

METHOD AND SYSTEM FOR POWER HEADROOM REPORTING IN THE PRESENCE OF MULTIPLE TRANSMIT ANTENNAS

CROSS-REFERENCE TO RELATED APPLICATIONS/INCORPORATION BY REFERENCE

The present application claims benefit of U.S. Provisional Application No. 61/384,765, filed on Sep. 21, 2010.

FIELD OF THE INVENTION

Certain embodiments of the invention relate to wireless communication devices. More specifically, certain embodiments of the invention relate to a method and system for power headroom reporting in the presence of multiple transmit antennas.

BACKGROUND OF THE INVENTION

New wireless technologies are being developed and/or deployed by operators and service providers. While third generation (3G) technologies provide significant improvements over second generation (2G) technologies, there is an ever-increasing demand for higher throughput and lower latency. A next-generation wireless network technology that provides improvements over 3G technologies is the $3^{rd}$ Generation Partnership Project (3GPP) LTE. Accordingly, there is a need to effectively implement the various functions and/or operations associated with LTE networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for power headroom reporting in the presence of multiple transmit antennas, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for LTE transmission power control. Various embodiments of the invention provide for a mobile device that may be operable for long term evolution LTE communication via a first transmit antenna and a second transmit antenna. The first transmit antenna may be a primary antenna of the device while the second transmit antenna may be a secondary transmit antenna of the device. The device may comprise a power amplifier for each transmit antenna with substantially similar maximum power being provided by both amplifiers. A power headroom value may be determined in the device based on an estimate of power received at a base station when transmission occurs concurrently via both the first and second transmit antennas. The estimate of the power received at the base station may be based on a received path loss value for each of the transmit antennas. The device may generate an indication of the determined power headroom value for communication to the base station. The power headroom value may be reported periodically or in response to a change in the transmit power.

Figure 1:
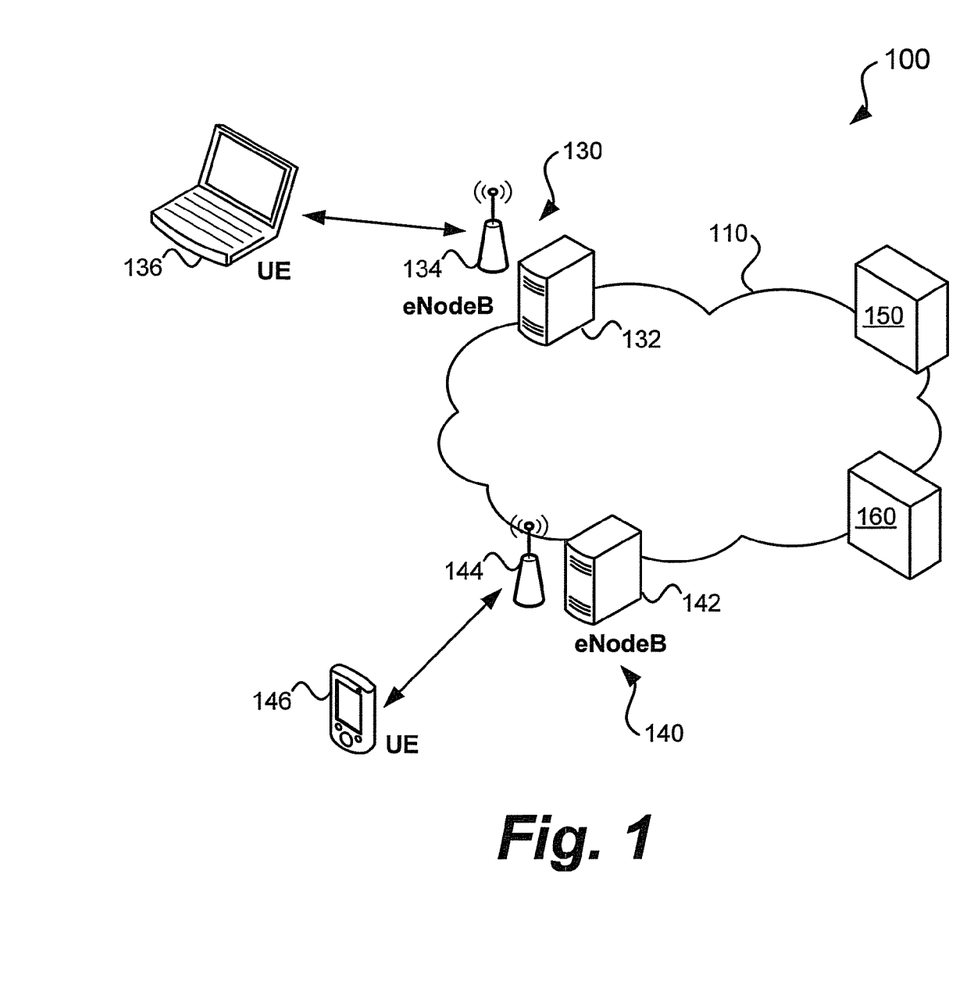
FIG. 1 is a diagram that illustrates an exemplary LTE network, in accordance with an embodiment of the invention.

FIG. 1 is a diagram that illustrates an exemplary LTE network, in accordance with an embodiment of the invention. Referring to FIG. 1, there is shown an LTE network 100 that may comprise an Internet Protocol (IP) core network 110, base stations 130 and 140, mobile devices 136 and 146, and gateways 150 and 160. Each of the base stations 130 and 140 may also be referred to as an evolved Node B (eNodeB), where Node B is in reference to a network node for a base transceiver station. Each of the mobile devices 136 and 146 may also be referred to as a user equipment (UE).

The IP core network 110 may comprise a multi-access core network that enables scalability and deployment flexibility. The gateways 150 and 160 may comprise suitable logic, circuitry, code, and/or interfaces that are operable for communication between the IP core network 110 and one or more other networks such as intranets, the Internet, IP Multimedia Subsystem (IMS), and the Public Switched Telephone Network (PSTN), for example.

The base station 130 may comprise a transceiver 134 and an associated base station controller 132. In some instances, when a reference is made to an eNodeB, it may be a reference to the transceiver of the base station or to both the transceiver of the base station and its associated base station controller. The transceiver 134 may comprise multiple antennas as well as suitable hardware and/or software for transmitting and receiving radio frequency (RF) signals and for communicating with the base station controller 132. The base station controller 132 may comprise suitable logic, circuitry, code, and/or interfaces that may be operable to control or manage at least a portion of the communication between the base station 130 and the mobile device 136. The base station controller 132 may be operable to provide transmission control operations for controlling or managing the amount of power that the mobile terminal 136 is to use for RF transmissions to the base station 130.

The base station 140 may comprise a transceiver 144 and an associated base station controller 142. The transceiver 144 and the base station controller 142 may operate in a substantially similar manner as the transceiver 134 and the base station controller 132 described above. In this regard, the base station controller 142 may be operable to provide transmission control operations for controlling or managing the amount of power that the mobile terminal 146 is to use for RF transmissions to with the base station 140. While each base station is shown to have its own associated base station controller, some embodiments of the invention may have more than one transceiver being associated to the same base station controller.

The mobile terminals 136 and 146 may each comprise multiple transmit antennas and multiple receive antennas that may be operable to support Multiple-Input Multiple-Output (MIMO) communication with a base station. In some embodiments of the invention, one or both of the mobile terminals 136 and 146 may be operable to communicate with a base station using Orthogonal Frequency Division Multiplexing (OFDM), for example. Each of the mobile terminals 136 and 146 may comprise suitable logic, circuitry, code, and/or interfaces that may be operable to perform various transmission control operations for controlling or managing the amount of power that is to be used for RF transmissions to a base station.

In operation, a mobile terminal or user equipment, such as the mobile terminal 146, for example, may transmit one or more preambles during a random access operation for detection by a base station, such as the base station 140, for example. When the mobile terminal 146 receives no indication that it has been heard by a base station, in this case the base station 140, the mobile terminal 146 may increase or ramp-up the transmission power to ensure that contention from other devices and/or channel conditions are not limiting a base station's ability to detect and decode the preambles being sent by the mobile terminal 146. Once an indication is received by the mobile terminal 146 that it has been heard by the base station 140, the mobile terminal 146 may begin transmitting data to the base station 140 via one or more uplink channels such as a Physical Uplink Shared Channel (PUSCH) and a Physical Uplink Control Channel (PUCCH).

During transmission, the mobile terminal 146 may report a power headroom value to the base station 140 on a periodic basis and/or when there is an event such as a change in conditions that prompts a new report to be sent. The mobile terminal 146 may comprise two transmit antennas for MIMO communication and the power headroom (PH) value may be based on the concurrent transmission through both transmit antennas by the mobile terminal 146. Moreover, the power headroom value may be based on the path loss associated with each transmit antenna and a corresponding receive antenna in the base station 140.

Over time, the base station 140 may send Transmit Power Control (TPC) commands to the mobile terminal 146 to slightly increase or slightly decrease the transmission power. These changes may be based on, for example, changes in channel conditions from the base station 140 to the mobile terminal 146. The mobile terminal 146, and the base station 140, may keep track of the current level of transmission power based on an accumulated value that increases or decreases in response to the TPC command. For example, a TPC command may increase the transmission power by 1 dB from its current level or may decrease the transmission power by 1 dB from its current level. In this case, both the mobile terminal 146 and the base station 140 may adjust a local accumulated value based on whether an increase or decrease in transmission power is requested. By synchronizing the accumulated values in both the mobile terminal 146 and the base station 140 the transmission of data may be optimized.

Figure 2:
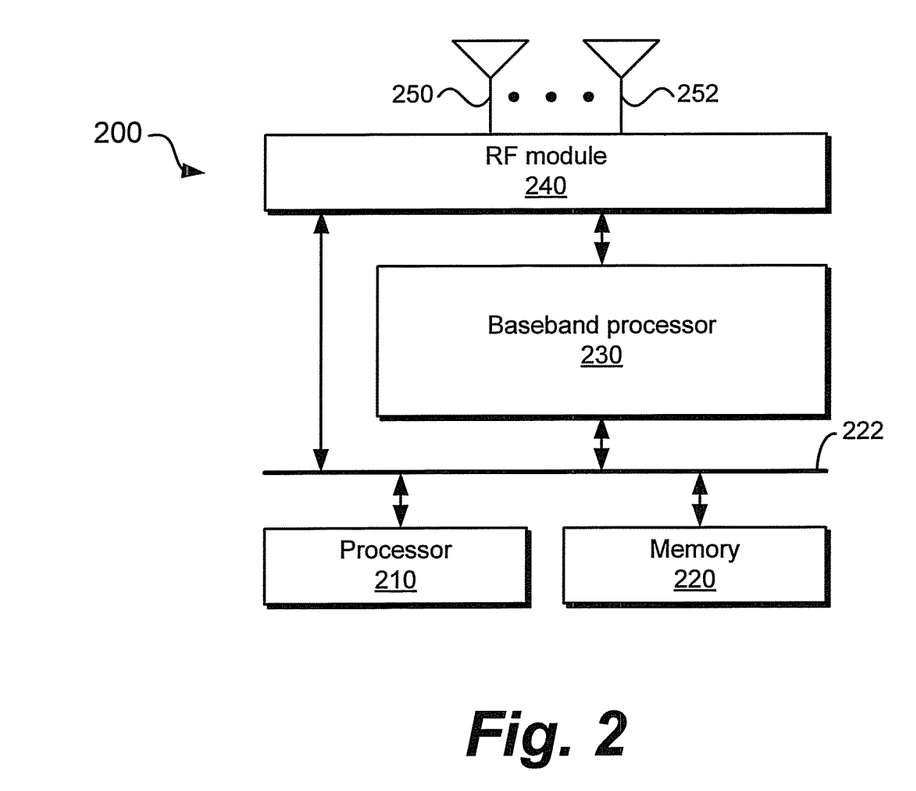
FIG. 2 is a block diagram that illustrates an exemplary user equipment architecture, in accordance with an embodiment of the invention.

FIG. 2 is a block diagram that illustrates an exemplary user equipment architecture, in accordance with an embodiment of the invention. Referring to FIG. 2, there is shown an architecture for a mobile terminal or user equipment 200 that may comprise a processor 210, a memory 220, a baseband processor 230, an RF module 240, and a plurality of antennas 250, . . . , 252. In some embodiments of the invention, some or all of the antennas 250, . . . , 252 in the mobile terminal or user equipment 200 may be transmit/receive (Tx/Rx) antennas. In some embodiments of the invention, some of the antennas 250, . . . , 252 may be receive (Rx) only antennas. Also shown is a bus 222 that may be operable to communicate data and/or control information between the processor 210, the memory 220, the baseband processor 230, and/or the RF module 240. The bus 212 may be operable to communicate with another component of the mobile terminal or user equipment to transfer data and/or control information. The mobile terminal or user equipment 200 may correspond to the mobile terminals 136 and 146 described above with respect to FIG. 1.

The processor 210 may comprise suitable logic, circuitry, code, and/or interfaces that may be operable to control, configure, and/or manage the memory 220, the baseband processor 230, and the RF module 240. The memory 220 may comprise suitable logic, circuitry, code, and/or interfaces that may be operable to store information associated with the operation of the mobile terminal or user equipment 200.

The baseband processor 230 may comprise suitable logic, circuitry, code, and/or interfaces that may be operable to process baseband information for LTE communication. The baseband information may comprise data, networking information, protocol information, and/or other like information, and may be received through signals provided by the RF module 240, the processor 210, the memory 220, and/or through the bus 212. The baseband processor 230 may be operable to support MIMO and/or OFDM operations for wireless communication with a base station.

The baseband processor 230 may be operable to perform operations associated with transmission power control. In this regard, the baseband processor 220 may be operable to calculate a power headroom value to be communicated to a base station, to determine appropriate corrections to be made to an accumulated value related to the transmission power to be used by the mobile terminal or user equipment 200, and/or determine an appropriate power with which to initialize data transmission via PUSCH and PUCCH.

The antennas 250, . . . , 252 may be operable to support MIMO communication and/or any other type of smart antenna technology in which two or more transmit antennas and/or two or more receive antennas are utilized. In some smart antenna technologies there may be multiple transmit antennas and a single receive antenna or a single transmit antenna and multiple transmit antennas. In one embodiment of the invention, the mobile terminal or user equipment 200 may operate in a 2×2 MIMO communication mode. In another embodiment of the invention, the mobile terminal or user equipment 200 may operate in a P×Q MIMO communication mode, where the integer P may be the same or different than the integer Q.

The RF module 240 may comprise suitable logic, circuitry, code, and/or interfaces that may be operable to provide up-conversion of baseband signals provided by the baseband processor 230 to RF signals for wireless transmission. The RF module 240 may also be operable to provide down-conversion of received RF signals to baseband signals that are communicated to the baseband processor 230 for further processing. The RF module 240 may comprise one or more power amplifiers (PAs) (not shown) that may be utilized to amplify signals prior to wireless transmission through the multiple transmit antennas 250. In some embodiments of the invention, each transmit antenna 250 may have a corresponding power amplifier. Moreover, each power amplifier associated with a transmit antenna 250 may be substantially similar to another power amplifier associated with a different transmit antenna 250.

In operation, the baseband processor 230 in the mobile terminal or user equipment 200 may generate one or more preambles for transmission during a random access operation for detection by a base station. When no indication is received that the mobile terminal or user equipment 200 has been heard by a base station, the RF module 240 may be used to increase or ramp-up the transmission power for subsequent preamble attempts to ensure that contention from other devices and/or channel conditions are not limiting a base station's ability to detect and decode the preambles being sent. Once an indication is received from a base station that the mobile terminal or user equipment 200 has been heard, the mobile terminal or user equipment 200 may begin transmitting data to that base station. In this regard, the mobile terminal or user equipment 200 may initialize the state of uplink channels PUSCH and PUCCH. The initialization may comprise determining an initial transmit power that takes into account the power from the first preamble attempt, the power from the last preamble attempt, the path loss associated with the first preamble attempt, and the path loss associated with the last preamble attempt.

During transmission, the processor 210 and/or the baseband processor 230 in the mobile terminal or user equipment 200 may be utilized to calculate a power headroom value that may be reported to the base station 140 on a periodic basis or when there is a change in conditions that prompts a new report to be sent. The power headroom value may be based on the concurrent transmission via two of the transmit antennas 250 when operating in a 2×2 MIMO communication mode, for example. Moreover, the power headroom value may be calculated based on the power received at the base station used instead of the power provided at the point of transmission.

Over time, the mobile terminal or user equipment 200 may receive TPC commands from the base station to increase or decrease the transmission power. These changes may be based on, for example, changes in channel conditions. When the transmission power is close to its maximum level or when it is close to its minimum level, the broadband processor 230 in the mobile terminal or user equipment 200 may follow set procedures to determine the manner in which to implement the TPC commands from the base station. The use of such procedures may enable the mobile terminal or user equipment 200 to remain synchronized with the base station by removing any ambiguities that may exist in related portions of the LTE standards.

Figure 3:
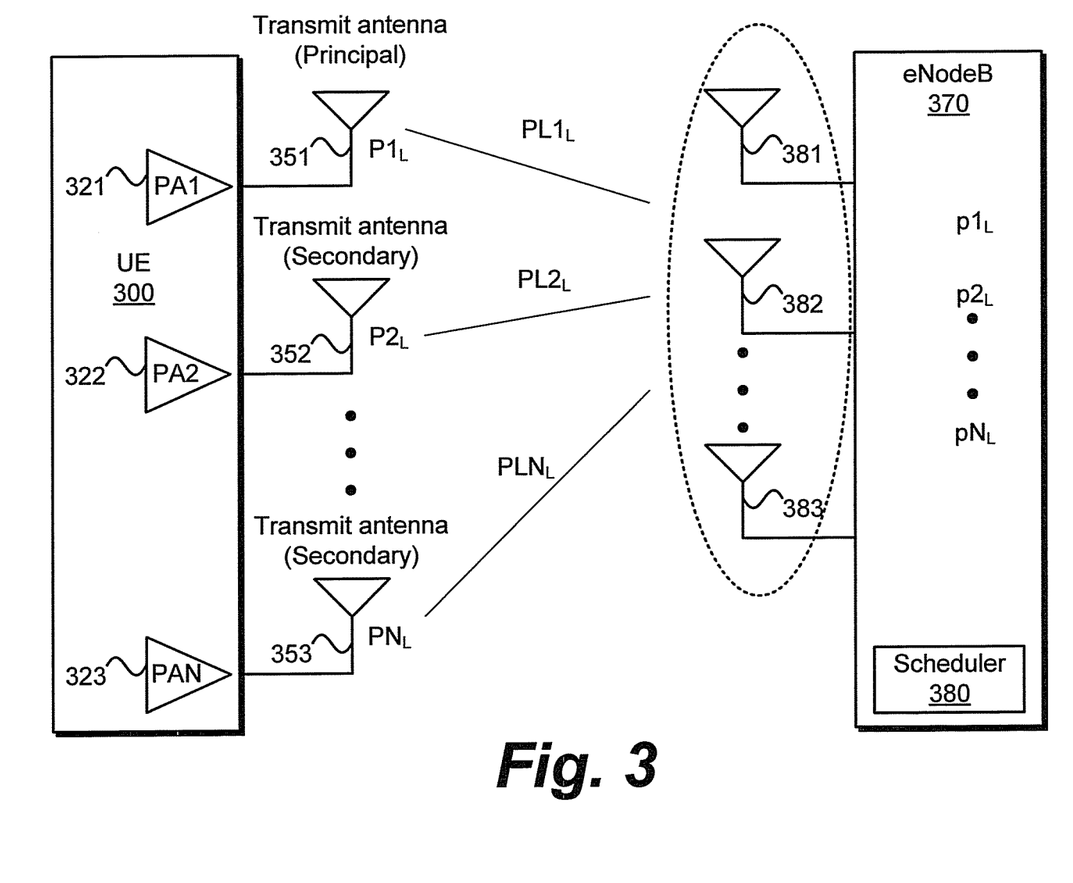
FIG. 3 is a diagram that illustrates an exemplary multi-antenna transmission from a user equipment to a base station, in accordance with an embodiment of the invention.

FIG. 3 is a diagram that illustrates an exemplary multi-antenna transmission from a user equipment to a base station, in accordance with an embodiment of the invention. Referring to FIG. 3, there is shown a UE 300 and an eNodeB 370. The UE 300 may comprise a first power amplifier (PA1) 321 that is connected to a transmit antenna (principal) 351 and a second power amplifier (PA2) 322 that is connected to a transmit antenna (secondary) 352. The transmit antenna that is considered or assigned to be the principal antenna may vary over time based on, for example, channel conditions. The UE 300 may comprise up to N power amplifiers and N transmit antennas as illustrated by the $N^{th}$ power amplifier (PAN) 323 and the $N^{th}$ transmit antenna (secondary) 353. The UE 300 may support concurrent transmission through two or more antennas as is the case in MIMO operations, for example. The UE 300 may correspond to the mobile terminals 136 and 146 in FIG. 1 and the mobile terminal or user equipment 200 in FIG. 2, for example.

The eNodeB 370 may be operable to receive the transmission from the various transmit antennas in the UE 300. For example, the eNodeB 370 may receive transmission from the transmit antenna 351 in the UE 300, from the transmit antenna 352, and/or from the transmit antenna 353. The eNodeB 370 may comprise multiple receive antennas, such as antennas 381, 382, . . . , and 383, to receive the transmissions from the UE 300. The eNodeB 370 may correspond to the base stations 130 and 140 in FIG. 1, for example. The eNodeB 370 may comprise a scheduler 380 that may be operable to process power headroom information for link adaptation. For example, the eNodeB 370 may assign higher coding modulations and larger allocations to the UE 370 based on available power headroom available at the UE 370. The scheduler 380 may base the decision to request that the power transmission by the UE 300 be increased on the assumption that such increase results in a similar increase in the amount of power received by the eNodeB 370 when the channel conditions do not change. This assumption, however, may be applicable when a single transmit antenna is being used for transmission from the UE 300 to the eNodeB 370 or, in the case when multiple transmit antennas are being used, the paths for those antennas do not show any imbalance. As noted above, the UE 300 may concurrently transmit using two or more transmit antennas. Moreover, the channel conditions in a typical wireless environment are dynamic and unlikely to result in balanced paths for all of the transmit antennas 351, 352, . . . , 353.

Below is an example of the errors that result when the power headroom information provided to the scheduler 380 is based on transmit power conditions for the multi-antenna UE 300 and when transmit antennas 321 and 322 are being used for communication. The maximum power for each of PA1 321 and PA2 322 is typically 23 decibels (dBs) to 1 milliwatt (mW) or 23 dBm. Consequently, when both antennas transmit at 23 dBm, the maximum combined transmit power for UE 300 is 26 dBm. In this example, the value of the path loss between the transmit antenna 351 and the eNodeB is 80 dB and the value of the path loss between the transmit antenna 352 and the eNodeB is 86 dB.

When the UE 300 utilizes a diversity scheme in which only one of the transmit antennas is used, typically the principal antenna, the maximum combined transmit power for the UE 300 is 23 dBm. The other antenna, typically the secondary antenna, is switched off. In this scenario, the total received power at the eNodeB 370 is 23 dBm-80 dB=−57 dBm. However, the value of the power headroom associated with the UE 300 and reported to the eNodeB 370 corresponds to 26 dBm. Accordingly, the eNodeB 370 may determine that the transmit power of the UE 300 may be increased by another 3 dB, which may allow the scheduler 380 to double the allocation provided to the UE 300.

With a doubling of the allocation, the UE 300 may increase the combined transmit power by 3 dB. To do so, the UE 300 may enable the previously switched off antenna and its corresponding power amplifier. In this instance, both antennas transmit at 23 dBm but the received power at the eNodeB 370 is −56 dBm, which is the sum of 23 dBm-80 dBm for one of the antennas and 23 dBm-86 dBm for the other antenna. Thus, while the transmit power provided by the UE 300 increased by 3 dB, the total received power at the eNodeB 370 increased by 1 dB.

In the above example, the eNodeB 370 expected a total received power of −54 dBm, that is, an increase of 3 dB over the −57 dBm originally received when a single transmit antenna was used by the UE 300. Due to the imbalance in path loss between the two antennas and the eNodeB 370, the eNodeB 370 received 2 dB less power than expected. This difference in received power may affect the link capacity since the eNodeB 370 may not be able to decode the transmission from the UE 300 given that a 2 dB lower carrier-to-interference plus noise ratio (CINR) was received than that which may be required to properly decode the transmission. Table I below shows the error that results at the eNodeB 370 when the power headroom is based on the transmit power of the UE 300 and there are imbalances in the paths loss between the transmit antennas 351 and 352 and the eNodeB 370.

TABLE I

Error in power headroom for different levels of path loss imbalance between the two transmit antennas.

| Path Loss Imbalance (dB) | Error in Power Headroom (dB) |
|---|---|
| 0 | 0 |
| 3 | 1.2 |
| 6 | 2 |
| 9 | 2.5 |

Instead of basing the power headroom on the power at the point of transmission, the UE 300 may report to the eNodeB 370 a power headroom value that is calculated based on the power received at the eNodeB 370 when the UE 300 concurrently utilizes both transmit antennas. To calculate or determine the power headroom in this manner, the UE 300 may need the measurements for the individual path losses for the two transmit antennas, the individual transmit power for the two transmit antennas, and the maximum power for the power amplifier of each of the two transmit antennas. Sending this information to the eNodeB 370 through a reporting process may be less efficient than having the UE 300 utilize the measurements and report or indicate to the eNodeB 370 a power headroom value calculated on the basis of the power received at the eNodeB 370. This reporting may occur according to a reporting schedule or in response to changes in the conditions and/or operations of the link between the UE 300 and the eNodeB 370.

Referring back to FIG. 3, the power in linear domain for the primary antenna, that is, the transmit antenna 351, is shown as $P1_L$. The power in linear domain for the secondary antenna, that is, the transmit antenna 352, is shown as $P2_L$. The total output power in linear domain for the two-antenna case is $pOut_L=P1_L+P2_L$. The values of the path losses between the primary and secondary antennas and the eNodeB 370 are shown as $PL1_L$ and $PL2_L$, respectively. The linear domain received power at eNodeB 370 from the primary and the secondary antennas are shown as $p1_L$ and $p2_L$, respectively. The maximum power for each of PA1 321 and PA2 322 in linear domain is $PA_{MAX\_L}$. The combined maximum power in linear domain for PA1 321 and PA2 322 is $P_{MAX\_L}$. In instances when the two power amplifiers are low cost power amplifiers and their output powers are substantially the same, then $P_{MAX\_L}=2\times PA_{MAX\_L}$. These values and/or measurements may be utilized by the UE 300 to calculate the power headroom to be sent to the eNodeB 370. In this regard, the power headroom calculated in terms of the UE 300 transmit power in linear domain is $PH_{UE\_L}$ and in decibels is $PH_{UE\_D}$. The power headroom calculated in terms of the eNodeB 370 receive power in linear domain is $PH_{eNB\_L}$ and in decibels is $PH_{eNB\_D}$. Also shown in FIG. 3 is $PN_L$, which is, the power in linear domain for the N$^{th}$ transmit antenna, that is, the transmit antenna 353, $PLN_L$, which is the value of the path loss between the N$^{th}$ transmit antenna and the eNodeB 370, and $pN_L$, which is the linear domain received power at eNodeB 370 from the N$^{th}$ transmit antenna.

When determining $PH_{UE\_L}$, the following expression may be utilized:

$$PH_{UE\_L}=P_{MAX\_L}/pOut_L=(2\times PA_{MAX\_L})/(P1_L+P2_L). \quad (1)$$

The combined received power at eNodeB 370 may be at a maximum when the UE 300 transmits maximum power. In other words, in such instances, $pOut_L=P_{MAX\_L}=2\times PA_{MAX\_L}$ and $P1_L=P2_L=PA_{MAX\_L}$. By defining the received power at eNodeB 370 from the transmit antennas 351 and 352 when the UE 300 transmits at maximum power as $p1'_L$ and $p2'_L$, the value of $PH_{eNB\_L}$ may be determined based on the following expression:

$$PH_{eNB\_L} = \frac{\text{Max} \cdot eNodeB \text{ receive power}}{\text{Current } eNodeB \text{ receive power}}, \quad (2)$$

$$= \frac{(p1'_L + p2'_L)}{(p1_L + p2_L)},$$

$$= \frac{\{(PA_{max\_L})/(PL1_L)+(PA_{max\_L})/(PL2_L)\}}{\{(P1_L)/(PL1_L)+(P2_L)/(PL2_L)\}},$$

$$= \frac{PA_{max\_L} \times (PL1_L + PL2_L)}{(P1_L \times PL2_L + P2_L \times PL1_L)}.$$

By letting $K1=PL1_L/PL2_L$, which in dB scale may correspond to the difference in received signal strength indication (RSSI) between the transmit antennas 351 and 352, $K2=P1_L/PA_{MAX\_L}$, and $K3=P2_L/PA_{MAX\_L}$, then equation (2) above may be simplified as follows:

$$PH_{eNB\_L}=(1+K1)/(K2+K1\times K3). \quad (3)$$

Therefore, the power headroom in dB based on the power received at eNodeB 370 is given by the following expression:

$$PH_{eNB\_D}=10\log_{10}\{(1+K1)/(K2+K1\times K3)\}. \quad (4)$$

The UE 300 may calculate the power headroom as indicated above with respect to equations (2), (3), and (4), and may report the result to the eNodeB 370 to indicate the actual power headroom available at the eNodeB 370 in terms of received power.

In another embodiment of the invention, when the N transmit antennas 351, 352, . . . , 353 of the UE 300 are utilized for transmission, each having its own transmit power maximum, the power headroom in linear domain based on the power received at an eNodeB may be given by the following expression:

$$PH_{eNB\_L} = \frac{\sum_{i=1}^{N} \frac{PAi_{max\_L}}{PLi_L}}{\sum_{i=1}^{N} \frac{Pi_L}{PLi_L}}, \quad (5)$$

where $PAi_{max\_L}$ is the transmit power maximum for the i$^{th}$ antenna in linear domain, $PLi_L$ is the path loss for the i$^{th}$ antenna in linear domain, $Pi_L$ is the current transmit power of the i$^{th}$ antenna in linear domain, and N is as above.

As noted above with respect to FIGS. 1 and 2, a mobile terminal or user equipment in an LTE network may receive TPC commands from a base station to adjust the amount of transmit power. By adjusting the transmit power of the user equipment, the link capacity between the user equipment and the base station may be optimized to the changing conditions in the wireless environment and/or based on the needs of the system, for example. The user equipment and the base station may synchronize local variables or accumulation values that indicate the current amount of transmit power that is being provided. For example, when a positive TPC command is sent to a user equipment to increase its transmit power by 1 dB, the base station may also increase its local variable by 1 dB to keep the transmit power information associated with that user equipment synchronized. Similarly, when a negative TPC command is sent to the user equipment to reduce its transmit power by 1 dB, the base station may also reduce its local variable by 1 dB. The step sizes of TPC commands may be of 1 dB, 2 dB, or 3 dB, for example. Other TPC command step sizes may also be utilized.

An issue may arise when the transmit power is close to the physical limits of the transmission devices. The power amplifiers used by a user equipment, such as the PA1 321 and the PA2 322 in the UE 300 shown in FIG. 3, for example, have a minimum amount of power and a maximum amount of power that may be generated for RF transmissions. In those instances in which the TPC commands place the total transmit power close to the upper end or the lower end of the power amplifiers capabilities, current standard specifications fail to provide clear guidance as to what is the user equipment to do such that the synchronization with the base station is maintained. In this regard, 3GPP TS 36.213, Sections 5.1.1 and 5.1.2 instruct that when a UE has reached maximum power, positive TPC commands are not to be accumulated, while when a UE has reached minimum power, negative TPC commands are not to be accumulated. The guidance provided by these sections is not at all clear and may result in less than optimal coordination between the user equipment and the base station.

It is not clear from the instructions provided in the 3GPP Standard whether the condition that the UE has reached maximum or minimum power is to be determined by the UE based on the transmit power of the most recent uplink transmission prior to the current sub-frame or based on the transmit power calculated for the current sub-frame. Basing the transmit power on a value associated with an old sub-frame does not account for changes in path loss, allocation size, coding modulation, and/or maximum transmit power allowed. Basing the transmit power on a value associated with the current sub-frame does account for changes in path loss, allocation size, coding modulation, and/or maximum transmit power allowed. However, there may be instances in which an uplink transmission is not scheduled for the current sub-frame but a TPC command may be relevant. It is also not clear from the 3GPP Standard whether a TCP command is to be discarded entirely if by accumulating its value the total transmit power crosses over the maximum possible power or the minimum possible power, or whether only that portion that takes the accumulated value across the power limits is to be discarded.

To address these ambiguities, the mobile terminals or user equipments described herein may operate based on a set procedure for performing power correction operations that take place when the accumulated value is close to the maximum or the minimum transmit power. An example of a power correction procedure that may be utilized in these situations is described below with respect to FIG. 4.

Figure 4:
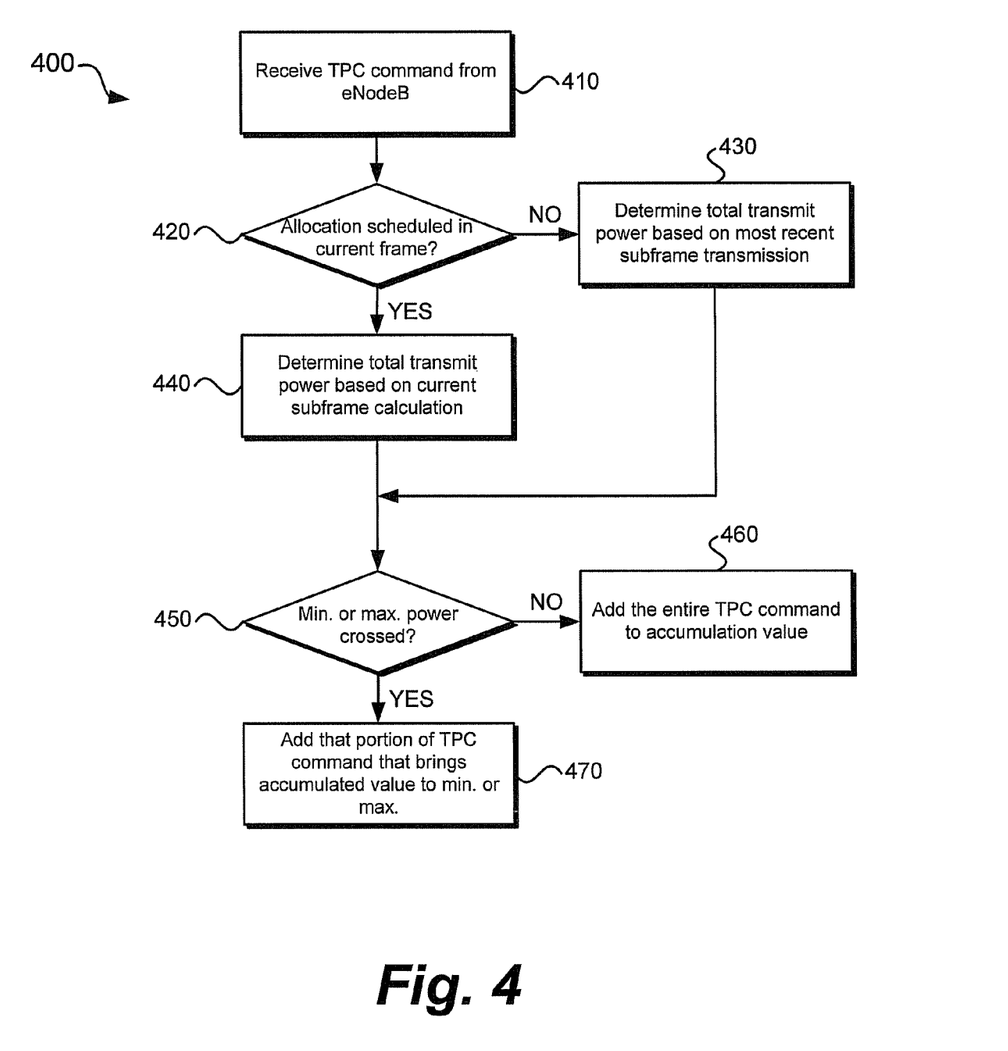
FIG. 4 is a flow chart that illustrates exemplary steps for power correction accumulation at maximum and minimum power, in accordance with an embodiment of the invention.

FIG. 4 is a flow chart that illustrates exemplary steps for power correction accumulation at maximum and minimum power, in accordance with an embodiment of the invention. Referring to FIG. 4, there is shown a flow chart 400, in which at step 410, a user equipment, such as the UE 300, for example, may receive a TPC command from an eNodeB, such as the eNodeB 370, for example, to perform power correction. The TPC command may be a positive TPC command or a negative TPC command. The eNodeB may generate the TPC command based on information regarding the characteristics of the link with the user equipment. The TPC command may be a command for an uplink channel such as PUSCH or PUCCH, for example.

At step 420, the user equipment may determine whether there is an allocation scheduled for PUSCH or for PUCCH in the current sub-frame. When an allocation is not scheduled, the process may proceed to step 430 in which the total transmit power is determined based on the most recent PUSCH or PUCCH transmission. When an allocation is scheduled, the process may proceed to step 440 in which the total transmit power is based on the transmit power computed for PUSCH or PUCCH in the current sub-frame.

At step 450, the user equipment may determine whether adding the TPC command to the accumulated value may result in a total transmit power that is above the maximum level or below the minimum level. When the limits of operation are not crossed, the process may proceed to step 460 in which the entire TPC command may be added to the accumulation value. Otherwise, the process may proceed to step 470 in which only the portion of the TPC command that brings the accumulated value to the maximum or the minimum level is added and the remaining portion is discarded. For example, when a positive TPC command required that 2 dB be added to the accumulated value but 1 dB may be enough to reach the maximum transmit power, then 1 dB is to be added to the accumulated value and the other 1 dB is to be discarded. Similarly, when a negative TPC command required that 2 dB be subtracted to the accumulated value but 1 dB may be enough to reach the minimum transmit power, then 1 dB is to be subtracted from the accumulated value and the other 1 dB is to be discarded.

As noted above with respect to FIGS. 1 and 2, a mobile terminal or user equipment in an LTE network may be operable to initialize the total transmit power of an uplink channel, such as PUSCH and PUCCH, for example, after a series of preambles are transmitted during a random access operation until one of them is finally detected and decoded by a base station. The transmit power for PUSCH in a sub-frame "i" may be given by the following expression:

$$P_{PUSCH}(i) = \min\{P_{CMAX}, 10 \log_{10}(M_{PUSCH}(i)) \ P_{O\_PUSCH}(j) + \alpha(j) \cdot PL + \Delta_{TF}(i) + f(i)\}, \quad (6)$$

where $P_{CMAX}$ is the maximum allowed user equipment power in the cell in dBm, $M_{PUSCH}(i)$ is the number of physical resource blocks (PRBs), $P_{O\_PUSCH}(j)$ is a combination of cell and user equipment specific parameters that is used to control signal-to-noise ratio (SNR), $\alpha(j)$ is a path loss compensation factor, PL is the downlink path loss estimate calculated by the user equipment based on a reference symbol received power (RSRP), $\Delta_{TF}(i)$ is cell and user equipment specific modulation and coding scheme defined in the 3GPP specifications for LTE, and f(i) is the accumulated power correction for the sub-frame. The transmit power for PUCCH in a sub-frame "i" may be given by the following expression:

$$P_{PUCCH} = \min\{P_{CMAX}, P_{0\_PUCCH} + PL + h(n_{CQI}, n_{HARQ}) + \Delta_{F\_PUCCH}(F) + g(i)\} \quad (7)$$

where $P_{CMAX}$ and PL are as described above, $P_{O\_PUCCH}$ is a combination of cell and user equipment specific parameters, $h(n_{CQI}, n_{HARQ})$ is based on the PUCCH format and on the number of channel quality indicator (CQI) bits and hybrid automatic repeat request (HARQ) bits, $\Delta_{F\_PUCCH}(F)$ is based on the PUCCH format F, and g(i) is the accumulated power correction for the sub-frame.

The last terms in equations (6) and (7) may be initialized as follows:

$$f(0) = \Delta P_{rampup} + \delta_{msg2} \quad (8)$$

$$g(0) = \Delta P_{rampup} + \delta_{msg2} \quad (9)$$

where $\Delta P_{rampup}$ is the total ramp-up in transmit power from the first attempted preamble sent by the user equipment to the last attempted preamble sent by the user equipment, and $\delta_{msg2}$ is the power correction that is sent by the base station after the detection and decoding of the preamble. The total ramp-up is defined in 3GPP TS 36.321, Section 5.1.4, by the following expression:

$$\Delta P_{rampup} = (\text{PREAMBLE\_TRANSMISSION\_COUNTER} - 1) * \text{powerRampingStep} \quad (10)$$

where PREAMBLE_TRANSMISSION_COUNTER is the number of preamble transmission attempts during the random access operation until a successful preamble transmission occurs, and powerRampingStep is a transmission power step value.

The transmission power is ramped-up after every unsuccessful preamble transmission attempt because, for example, the amount of power was insufficient to be detected or there is contention between several user equipments for access to the base station. Thus, in order to be heard by the base station, the user equipment continues to ramp up its power until a successful preamble transmission occurs. The initialization of PUSCH and PUCCH are then based on the final value of the ramped-up transmission power as indicated by equation (10). This approach, however, may present some unwanted consequences. For example, a user equipment may have ramped up its transmission power to the maximum level well before a preamble transmission is successful. Accordingly, the value of the PREAMBLE_TRANSMISSION_COUNTER, and thus the value of $\Delta P_{rampup}$, may continue to increase beyond the physical capabilities of the user equipment. This situation may occur because of the dynamic nature of a wireless network. In some instances, it may be a matter of time before a preamble transmission is successfully detected and decoded by a base station. Not only are the conditions of the channel changing over time, including path loss, for example, but also the number of other devices competing for access to the base station. As a result, the value of $\Delta P_{rampup}$ as determined by equation (10) may be high and the initialization of equations (8) and (9) for use with equations (6) and (7) may be based on a high initial transmit power. In such instances, the user equipment will likely cause interference to other devices and the base station may need to use power correction techniques, such as negative TPC commands, for example, to lower the accumulated value of the transmit power to a level that is within the physical capabilities of the user equipment.

Figure 5:
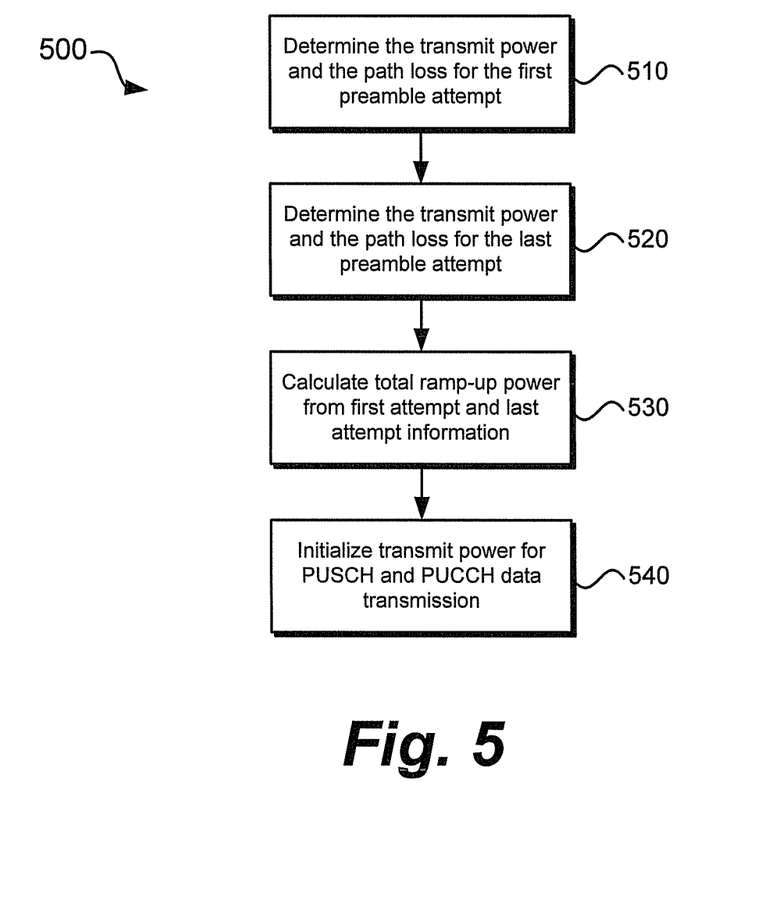
FIG. 5 is a flow chart that illustrates exemplary steps for transmission power control state initialization for PUSCH and PUCCH, in accordance with an embodiment of the invention.

To address the above-described overshoot that may occur in the value of $\Delta P_{rampup}$, the user equipment may initialize equations (8) and (9) based on a different calculation of $\Delta P_{rampup}$. FIG. 5 is a flow chart that illustrates exemplary steps for transmission power control state initialization for PUSCH and PUCCH, in accordance with an embodiment of the invention. Referring to FIG. 5, there is shown a flow chart 500 in which, at step 510, the user equipment, such as the UE 300, for example, may determine the transmit power of the preamble, $P_{PRACH}$, for the first preamble attempt. The user equipment may also determine the path loss, PL, associated with the first preamble attempt. At step 520, the user equipment may determine the transmit power of the preamble for the last preamble attempt. The user equipment may also determine the path loss associated with the last preamble attempt.

At step 530, the value of $\Delta_{rampup}$ may be calculated by considering the path loss in accordance with the following expression:

$$\Delta P_{rampup} = \{P_{PRACH}(\text{last attempt}) - P_{PRACH}(\text{first attempt})\} - \{PL(\text{last attempt}) - PL(\text{first attempt})\}. \quad (11)$$

The value that results from equation (11) may be the same as that of equation (10) when $P_{PRACH}(\text{last attempt})$ is less than $P_{CMAX}$. At step 540, by utilizing equation (11) to initialize transmit power for data transmission for PUSCH and PUCCH, the initial transmit power may not be higher than the maximum power that may be provided by the user equipment.

Another embodiment of the invention may provide a mobile device, such as the UE 300 in FIG. 3, for example, which is operable for LTE communication via a first transmit antenna and via a second transmit antenna, such as the transmit antennas 351 and 352, respectively. The first transmit antenna may be a primary antenna while the second transmit antenna may be a secondary antenna. In this regard, a first path loss value associated with the primary antenna may be lower than a second path loss value associated with the secondary antenna. The UE 300 may determine a power headroom value, based on an estimate of power received at a base station, such as the eNodeB 370, for example, when transmission occurs concurrently via both the transmit antennas 351 and 352. The UE 300 may generate an indication, such as a report, for example, of the determined power headroom value for communication to the eNodeB 370.

The UE 300 may comprise a first power amplifier for LTE communication via the first transmit antenna, such as the PA1 321, for example. The UE 300 may also comprise a second power amplifier for LTE communication via the second transmit antenna, such as the PA2 322, for example. The maximum power provided by the first power amplifier may be substantially similar to a maximum power provided by the second power amplifier. In some embodiments of the invention, the maximum power of either amplifier may be about 23 dBm, for example.

The UE 300 may receive a first path loss value associated with the first transmit antenna and a second path loss value associated with the second transmit antenna. These values, such as $PL1_L$ and $PL2_L$ in FIG. 3, for example, may be received from the eNodeB 370 on a periodic basis and/or may be determine from downlink path loss information, for example. The UE 300 may determine the estimate of power received at the eNodeB 370 based on the received first path loss value and the received second path loss value. In this regard, the UE 300 may determine a maximum receive power at the eNodeB 370 and a current receive power at the eNodeB 370. In some instances, the received first path loss value may be different from the received second path loss value. The UE 300 may determine the power headroom based on equation (3) described above for power in linear domain and based on equation (4) described above for power in decibels. The UE 300 may update the value of the power headroom value when the estimate of power received at the eNodeB 370 changes. In such instances, the UE 300 may generate an indication of the updated power headroom value for communication to the eNodeB 370.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for power headroom reporting in the presence of multiple transmit antennas.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A transmitter configured to wirelessly communicate with a receiver, the transmitter comprising:
    a first antenna configured to communicate with the receiver over a first path having a first path loss;
    a second antenna configured to communicate with the receiver over a second path having a second path loss, the second path loss being different from the first path loss; and
    a processor configured to calculate a power headroom value associated with the first antenna and the second antenna, the power headroom value being based on a first and second difference, the first difference being between the first path loss and a maximum transmit power associated with the first antenna, and the second difference being between the second path loss and a maximum transmit power associated with the second antenna,
    the processor further configured to enable reporting of the power headroom value to the receiver.

2. The transmitter of claim 1, wherein the power headroom value is associated with a combined power level to be received at the receiver.

3. The transmitter of claim 1, wherein the processor is configured to enable measurement of the first path loss and the second path loss.

4. The transmitter of claim 1, wherein the processor is further configured to enable transmission from the second antenna in order to increase a total power associated with transmission from the transmitter.

5. The transmitter of claim 1, wherein the processor is further configured to enable an increase in a total power of transmission from the transmitter, the increase in the total power being associated with the power headroom value.

6. A system, comprising:
    a processor and/or circuit in a base station comprising one or more receive antennas and that is configured to wirelessly communicate with a mobile device comprising a plurality of transmit antennas, the processor and/or circuit being configured to:
    receive a power headroom value from the mobile device, the power headroom value being based on a first difference and a second difference, the first difference being between a first path loss value and a first maximum transmit power, the second difference being between a second path loss value and a second maximum transmit power, and the power headroom value being associated with a combined power level at the base station; and
    process the received power headroom value to adjust one or more link parameters;
    wherein the first and second path loss values are associated with communication between the base station and the plurality of transmit antennas; and
    wherein the first and second maximum transmit powers are associated with respective transmit antennas of the plurality of transmit antennas.

7. A method in a mobile device that is configured to wirelessly communicate with a base station via a plurality of transmit antennas, the method comprising:
    determining a power headroom value based on a first difference and a second difference, the first difference being between a first path loss value and a first maximum transmit power, the second difference being between a second path loss value and a second maximum transmit power, and the power headroom value being associated with a combined power level at the base station; and
    communicating the power headroom value to the base station;
    wherein the first and second path loss values are associated with communication between the base station and the plurality of transmit antennas; and
    wherein the first and second maximum transmit powers are associated with respective transmit antennas of the plurality of transmit antennas.

8. The method of claim 1, wherein the mobile device comprises a power amplifier for each of the plurality of transmit antennas.

9. The method of claim 1, wherein the first maximum transmit power associated with the plurality of transmit antennas is different from the second maximum transmit power associated with the plurality of transmit antennas.

10. The method of claim 1, wherein a maximum total transmit power associated with the mobile device is different from a sum of maximum transmit powers respectively associated with each transmit antenna of the plurality of transmit antennas.

11. The method of claim 1, wherein the mobile device is operable to wirelessly communicate with the base station utilizing long term evolution (LTE) communication.

12. The method of claim 1, comprising determining the power headroom value utilizing the following expression:

$$PH_{eNB\_L} = \frac{\sum_{i=1}^{N} \frac{PAi_{max\_L}}{PLi_L}}{\sum_{i=1}^{N} \frac{Pi_L}{PLi_L}}$$

where $PAi_{max\_L}$ is the maximum transmit power associated with the $i^{th}$ transmit antenna from the plurality of transmit antennas in a linear domain, $PLi_L$ is the path loss value for the $i^{th}$ transmit antenna from the plurality of transmit antennas in the linear domain, $Pi_L$ is a current transmit power of the $i^{th}$ transmit antenna from the plurality of transmit antennas in the linear domain, and N is the number of transmit antennas in the plurality of transmit antennas.

13. The method of claim 1, comprising:
reporting to the base station an update to the power headroom value in response to a change in a parameter associated with the reception of a signal at the base station; and
generating an indication of the updated power headroom value for communication to the base station.

14. The method of claim 1, wherein the base station with which the mobile device wirelessly communicates comprises more than one receive antenna.

15. The method of claim 1, further comprising:
increasing a total power of transmission associated with the communication between the base station and the plurality of transmit antennas, the increasing the total power being associated with the power headroom value.

16. The method of claim 1, comprising determining the power headroom value based on a ratio of: a first ratio of a maximum transmit power associated with one of the plurality of transmit antennas and a corresponding path loss value associated with communication between the base station and the one of the plurality of transmit antennas, and a second ratio of a current transmit power associated with the one of the plurality of transmit antennas and the corresponding path loss value associated with the communication between the base station and the one of the plurality of transmit antennas.

17. A method in a base station comprising a receive antenna, the base station being configured to wirelessly communicate with a mobile device comprising a plurality of transmit antennas, the method comprising:
receiving a power headroom value from the mobile device, the power headroom value being based on a first difference and a second difference, the first difference being between a first path loss value and a first maximum transmit power, the second difference being between a second path loss value and a second maximum transmit power, and the power headroom value being associated with a combined power level at the base station; and
processing the received power headroom value to adjust one or more link parameters;
wherein the first and second path loss values are associated with communication between the base station and the plurality of transmit antennas; and
wherein the first and second maximum transmit powers are associated with respective transmit antennas of the plurality of transmit antennas.

18. A system, comprising:
a processor and/or circuit in a mobile device that is configured to wirelessly communicate with a base station utilizing a plurality of transmit antennas, the processor and/or circuit being configured to:
determine a power headroom value based on a first difference and a second difference, the first difference being between a first path loss value and a first maximum transmit power, the second difference being between a second path loss value and a second maximum transmit power, and the power headroom value being associated with a combined power level at the base station; and
enable communication of the power headroom value to the base station;
wherein the first and second path loss values are associated with communication between the base station and the plurality of transmit antennas; and
wherein the first and second maximum transmit powers are associated with respective transmit antennas of the plurality of transmit antennas.

19. The system of claim 18, wherein the processor and/or circuit comprises a power amplifier for each of the plurality of transmit antennas.

20. The system of claim 18, wherein maximum transmit powers respectively associated with each of the plurality of transmit antennas are substantially the same.

21. The system of claim 18, wherein the first maximum transmit power associated with the plurality of transmit antennas is different from the second maximum transmit power associated with the plurality of transmit antennas.

22. The system of claim 18, wherein a maximum total transmit power associated with the mobile device is different from a sum of maximum transmit powers respectively associated with each transmit antennas of the plurality of transmit antennas.

23. The system of claim 18, wherein the mobile device is configured to wirelessly communicate with the base station utilizing Long Term Evolution (LTE) communication.

24. The system of claim 18, wherein the processor and/or circuit is configured to determine the power headroom value utilizing the following expression:

$$PH_{eNB\_L} = \frac{\sum_{i=1}^{N} \frac{PAi_{max\_L}}{PLi_L}}{\sum_{i=1}^{N} \frac{Pi_L}{PLi_L}}$$

where $PAi_{max\_L}$ is the maximum transmit power associated with the $i^{th}$ transmit antenna from the plurality of transmit antennas in a linear domain, $PLi_L$ is the path loss value for the $i^{th}$ transmit antenna from the plurality of transmit antennas in the linear domain, $PLi_L$ is a current transmit power of the $i^{th}$ transmit antenna from the plurality of transmit antennas in the linear domain, and N is the number of transmit antennas in the plurality of transmit antennas.

25. The system of claim 18, wherein the processor and/or circuit is configured to:
report to the base station an update to the power headroom value in response to a change in a parameter associated with the reception of a signal at the base station; and
generate an indication of the updated power headroom value for communication to the base station.

26. The system of claim 18, wherein the base station with which the mobile device wirelessly communicates comprises more than one receive antenna.

27. The system of claim 18, wherein the combined power level at the base station is the power level to be received at the base station.

28. The system of claim 18, wherein the processor and/or circuit is further configured to increase a total power of transmission associated with the communication between the base station and the plurality of transmit antennas.

* * * * *

UNITED STATES PATENT AND TRADEMARK OFFICE
CERTIFICATE OF CORRECTION

Page 1 of 1

PATENT NO. : 9,173,178 B2
APPLICATION NO. : 13/077839
DATED : October 27, 2015
INVENTOR(S) : Chakraborty et al.

It is certified that error appears in the above-identified patent and that said Letters Patent is hereby corrected as shown below:

Claims

Column 13, lines 54-55, claim 3, please replace "the processor is configured" with --the processor is further configured--.

Column 14, line 40, claim 8, please replace "method of claim 1" with --method of claim 7--.

Column 14, line 43, claim 9, please replace "method of claim 1" with --method of claim 7--.

Column 14, line 47, claim 10, please replace "method of claim 1" with --method of claim 7--.

Column 14, line 52, claim 11, please replace "method of claim 1" with --method of claim 7--.

Column 14, line 55, claim 12, please replace "method of claim 1" with --method of claim 7--.

Column 15, line 7, claim 13, please replace "method of claim 1" with --method of claim 7--.

Column 15, line 14, claim 14, please replace "method of claim 1" with --method of claim 7--.

Column 15, line 17, claim 15, please replace "method of claim 1" with --method of claim 7--.

Column 15, line 22, claim 16, please replace "method of claim 1" with --method of claim 7--.

Signed and Sealed this
Twenty-second Day of March, 2016

Michelle K. Lee
*Director of the United States Patent and Trademark Office*